US009147189B2

(12) United States Patent
Kelly et al.

(10) Patent No.: US 9,147,189 B2
(45) Date of Patent: Sep. 29, 2015

(54) SECURE REPORTS FOR ELECTRONIC PAYMENT SYSTEMS

(75) Inventors: James Kelly, Jamestown, NC (US); Francis C. Williams, Jamestown, NC (US); Michael Symonds, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 1156 days.

(21) Appl. No.: 12/544,995

(22) Filed: Aug. 20, 2009

(65) Prior Publication Data

US 2011/0047081 A1    Feb. 24, 2011

(51) Int. Cl.
| | |
|---|---|
| G06Q 99/00 | (2006.01) |
| G06Q 20/38 | (2012.01) |
| G06Q 20/20 | (2012.01) |
| G06Q 20/40 | (2012.01) |
| G07F 13/02 | (2006.01) |
| H04L 9/08 | (2006.01) |

(52) U.S. Cl.
CPC ............ *G06Q 20/3823* (2013.01); *G06Q 20/20* (2013.01); *G06Q 20/401* (2013.01); *G07F 13/025* (2013.01); *H04L 9/0819* (2013.01); *H04L 9/0894* (2013.01); *G06Q 20/382* (2013.01); *H04L 2209/56* (2013.01)

(58) Field of Classification Search
CPC ......................... G06Q 20/3823; G06Q 20/382
USPC ................................ 380/485; 705/64; 235/80
See application file for complete search history.

(56) References Cited

U.S. PATENT DOCUMENTS

| | | | |
|---|---|---|---|
| 5,228,084 A | 7/1993 | Johnson et al. | |
| 5,923,572 A | 7/1999 | Pollock | |
| 6,360,138 B1 * | 3/2002 | Coppola et al. | 700/231 |
| 7,277,010 B2 * | 10/2007 | Joao | 340/539.25 |
| 7,870,614 B1 * | 1/2011 | Duhaime et al. | 726/28 |
| 7,902,993 B2 * | 3/2011 | DeMarco | 340/686.1 |
| 8,306,920 B1 * | 11/2012 | Lynch | 705/71 |
| 8,401,155 B1 * | 3/2013 | Barnes et al. | 379/67.1 |
| 8,549,279 B1 * | 10/2013 | Sahasranaman et al. | 713/150 |
| 2001/0016871 A1 * | 8/2001 | Fujita | 709/203 |
| 2001/0020198 A1 * | 9/2001 | Wilson | 700/232 |
| 2003/0200108 A1 * | 10/2003 | Malnoe | 705/1 |
| 2004/0143594 A1 * | 7/2004 | Kalies | 707/103 R |
| 2004/0230792 A1 * | 11/2004 | McCarty | 713/153 |
| 2005/0005145 A1 * | 1/2005 | Teixeira | 713/193 |
| 2005/0262027 A1 * | 11/2005 | Hutchinson et al. | 705/75 |
| 2006/0012479 A1 * | 1/2006 | Ezra | 340/572.1 |
| 2006/0190129 A1 * | 8/2006 | DeLine et al. | 700/232 |
| 2006/0259782 A1 * | 11/2006 | Wang et al. | 713/189 |
| 2007/0033074 A1 * | 2/2007 | Nitzan et al. | 705/3 |

(Continued)

OTHER PUBLICATIONS

International Search Report and Written Opinion dated Sep. 29, 2010 for PCT International Application No. PCT/US10/44912 filed on Aug. 9, 2010.

(Continued)

*Primary Examiner* — James D Nigh
(74) *Attorney, Agent, or Firm* — Nelson Mullins Riley & Scarborough LLP

(57) ABSTRACT

A system, device, and method for generating and transmitting secure reports or documents in a retail environment or payment system comprising both secure and unsecure portions, where users of the unsecure portions may require access to sensitive information stored by the secure portions for various purposes, such as reporting, accounting, or reconciliation.

37 Claims, 6 Drawing Sheets

(56) References Cited

U.S. PATENT DOCUMENTS

| | | | |
|---|---|---|---|
| 2007/0079386 A1* | 4/2007 | Metzger et al. | 726/29 |
| 2007/0106559 A1* | 5/2007 | Harrell | 705/21 |
| 2007/0152058 A1* | 7/2007 | Yeakley et al. | 235/462.01 |
| 2008/0040287 A1* | 2/2008 | Harrell et al. | 705/71 |
| 2008/0077534 A1* | 3/2008 | Son | 705/76 |
| 2008/0283590 A1* | 11/2008 | Oder et al. | 235/380 |
| 2009/0058641 A1* | 3/2009 | DeMarco | 340/540 |
| 2009/0103725 A1* | 4/2009 | Tang et al. | 380/45 |
| 2009/0190159 A1* | 7/2009 | Toscano et al. | 358/1.15 |
| 2009/0265638 A1* | 10/2009 | Carapelli et al. | 715/741 |
| 2010/0030697 A1* | 2/2010 | Goodrich et al. | 705/75 |
| 2010/0050249 A1* | 2/2010 | Newman | 726/15 |
| 2010/0070754 A1* | 3/2010 | Leach | 713/152 |
| 2010/0293099 A1* | 11/2010 | Pauker et al. | 705/67 |

OTHER PUBLICATIONS

Extended European Search Report issued in corresponding European patent application No. 10810388.8 on Dec. 15, 2014, all enclosed pages cited.

* cited by examiner

SECURE REPORTS FOR ELECTRONIC PAYMENT SYSTEMS

FIELD OF THE INVENTION

The present invention relates generally to payment systems, and more particularly, to an apparatus and method for generating a secure report in an electronic payment system.

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright whatsoever.

BACKGROUND OF THE INVENTION

The Payment Card Industry Security Standards Council ("PCI") is at least one of the entities tasked with development, dissemination, and implementation of security standards for the protection of customers' financial and account information. PCI established the Payment Application Data Security Standard ("PA-DSS") in an effort to regulate payment applications and systems that handle sensitive cardholder data, such as a customer's financial account number (including the Primary Account Number ("PAN")), personal identification number ("PIN"), or Card Security Code or Verification Value ("CVV2").

In order for a payment system to be deemed PA-DSS compliant, it must adhere to the requirements contained in the PA-DSS. For instance, the standard requires that any cardholder data or account information be protected. Accordingly, any device that manages or handles the information must ensure that the cardholder data is secure. Devices that comply with all of the PA-DSS requirements are considered PA-DSS compliant or "secure," and those that do not are referred to as "unsecure." It is typical to have both devices that are secure and devices that are unsecure within a single payment system. Unsecure devices are generally less expensive initially, as well as less expensive to maintain. In order for an entire system having both secure and unsecure devices to meet the PA-DSS, any sensitive cardholder data or account information cannot be handled by or transmitted to any unsecure device. Additionally, if sensitive cardholder data is transmitted via a network accessible to the public or susceptible to compromise, the data must be encrypted.

Payment systems have been incorporated into fueling sites in order to allow a customer to pay for the fuel dispensed using a credit or debit card. Such systems comprise various input devices, such as card readers and PIN pads, that are configured to accept account information from a customer. For instance, the customer may provide an account number by swiping a card bearing a magnetic strip through a card reader. The customer may then enter the PIN associated with the card using a PIN pad. The system communicates this information to the host system responsible for the customer's account for verification. The system encrypts the information according to the host system's encryption scheme prior to transmission.

Certain information or data may also be transmitted to the payment system's point-of-sale device ("POS") during or after the transaction. For example, following completion of the transaction, information needed to print a customer receipt that does not contain sensitive cardholder data is transmitted to the POS. For example, the receipt may contain the last four digits of the account number with the preceding digits shown by asterisks. POS's are typically unsecure and therefore do not handle cardholder data or account information in order for the payment system to comply with the PA-DSS. In this example, the system does not encrypt the data transmitted to the POS that is needed to print the receipt because the transmitted data does not contain any sensitive cardholder data.

An example of such a payment system adapted for use in a fueling environment is described in U.S. Pat. No. 5,448,638 ("the '638 patent"), which is hereby incorporated in its entirety by reference for all purposes. The system described in the '683 patent utilizes a security module to communicate securely with the input devices at the fuel dispensers and a host system.

In certain situations, the retailer associated with the payment system requires portions of the cardholder data for reconciliation purposes. For instance, the retailer may need to credit a customer's account or manually complete a transaction that was previously declined in error, both of which require use of sensitive cardholder data.

Various techniques have been attempted in order to retrieve the desired information from the secure portion (i.e., the "secure environment") of the payment system. For example, a printer may be installed within the secure environment in order to print reports containing the account information. This option, however, increases both the initial costs and maintenance costs associated with the system.

Another option is to attach a printer to the POS or to use the printer already attached to the POS for printing receipts. This option adds a layer of complexity since the POS would need to be relocated within the secure environment. The POS may be manufactured by a party other than the manufacturer of the secure devices, thereby making it difficult to reconfigure the POS as a secure device. Moreover, the system may not include a POS if it operates in an unattended scenario.

Alternatively, the account information may be transferred to and stored on removable storage (such as a compact disc or flash drive). Removable storage devices are unsecure by default, however, providing no security to the sensitive data they contain. Thus, extra processes and procedures are required to dictate the retention, use, and destruction of the information if stored on a removable storage device.

SUMMARY OF THE INVENTION

In one aspect, the present invention provides a method for transmitting information securely in a retail environment comprising at least one secure device, where the at least one secure device is operatively connected to a host system. The method comprising storing sensitive data by the at least one secure device, receiving a request for at least a portion of the sensitive data at the at least one secure device, and generating a secure report containing the at least a portion of the sensitive data by the at least one secure device.

In another aspect, the present invention provides a fueling environment comprising at least one fuel dispenser and at least one secure device operatively connected to the at least one fuel dispenser. The at least one secure device is configured to receive sensitive data from the at least one fuel dispenser, encrypt the sensitive data, store at least a portion of the sensitive data, and generate a secure report containing the at least a portion of the sensitive data.

In yet another aspect, the present invention provides a secure device for generating a secure report associated with a financial transaction comprising a processing device and memory operatively connected to the processing device. The memory comprises computer-readable instructions that, when executed by the processing device, perform a method. The method comprises encrypting sensitive data associated with the financial information received by the secure device and generating a secure report containing at least a portion of the sensitive data.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
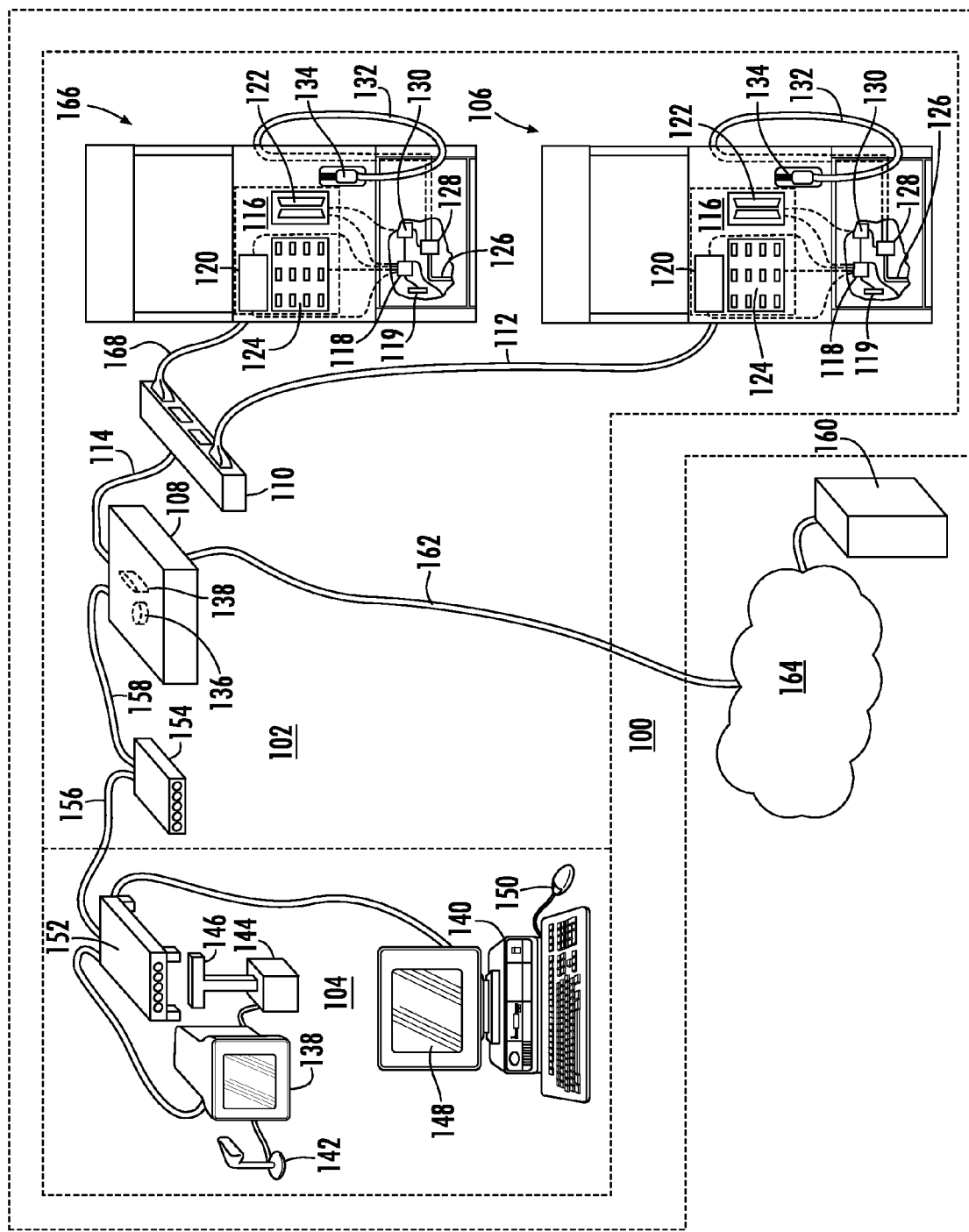
FIG. 1 is a schematic representation of a retail payment system in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a payment system 100 configured for use at a fueling site in accordance with an embodiment of the present invention. Payment system 100 comprises a secure communication portion 102 and a store (unsecure) communication portion 104. Secure communication portion 102 comprises at least one fuel dispenser 106 operatively connected to a secure device 108, which may be accomplished via a distribution box 110. Preferably, secure device 108 is an enhanced dispenser hub, an example of which is provided in U.S. patent application Ser. No. 61/145,578, filed on Jan. 18, 2009, the entire disclosure of which is hereby incorporated as if set forth verbatim herein. It should be understood by those of ordinary skill in the art that secure device 108 may be any PA-DSS compliant device capable of securely communicating with other devices. In the presently-described embodiment, fuel dispenser 106 is connected via a communication path 112 to distribution box 110, which is connected to secure device 108 via another communication path 114.

Fuel dispenser 106 comprises a user interface 116, a processing device 118, and memory 119. Processing device 118 is operatively connected to both user interface 116 and memory 119. User interface 116 comprises a display 120 and input devices, such as a card reader 122 and a PIN pad 124, configured to allow customers to provide account information to the fuel dispenser. As should be understood by those of ordinary skill in the art, fuel dispenser 106 comprises additional components configured to deliver fuel to a vehicle including a piping network 126 attached to one or more underground storage tanks, a meter 128, a pulser 130, a hose 132, and a nozzle 134. Processing device 118 is operatively connected to one or more of these devices in order to control their operation and manage the delivery of fuel as described in more detail below. Fuel dispenser 106 may include a built-in receipt printer.

In a preferred embodiment, secure device 108 comprises a processing device 136 and memory 138. Each of processing devices 118 and 136 may be a processor, microprocessor, controller, microcontroller, or other suitable circuitry. Memories 119 and 138 may be any memory or computer-readable medium as long as it is capable of being accessed by processing devices 118 and 136, respectively, including random access memory ("RAM"), read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, any type of non-volatile memories, such as secure digital ("SD"), flash memory, memory stick, or any other medium that may be used to carry or store computer program code in the form of computer-executable programs, instructions, or data. Processing devices 118 and 136 may also include a portion of memory accessible only to the processing device.

Memories 119 and 138 comprise computer-executable program code or instructions that, when executed by respective processing device 118 or 136, perform one or more steps of the processes described in more detail below with respect to FIGS. 2 and 3. The program code or instructions additionally include data representative of the graphical user interfaces described in more detail below with respect to FIGS. 5, 6, and 7. Each of memories 119 and 138 may also comprise data and one or more data structures for storing information. The computer-executable program code or instructions in this scenario, as should be known to those skilled in the art, usually include one or more application programs, other program modules, program data, firmware, and/or an operating system. Computer-executable program code or instructions may also be stored on the memory of processing devices 118 or 136. In an exemplary embodiment, memories 119 and 138 store one or more encryption algorithms, keys, and/or ciphers used to encrypt sensitive cardholder data as described in more detail below.

Store communication portion 104 comprises a POS 138 and may additionally comprise other devices, such as a manager workstation 140. POS 138 may include additional components, such as a barcode scanner 142, a receipt printer 144, and an amount display 146. Manager workstation 140 may also include other peripherals, such as a display 148 and one or more input devices, such as a keyboard or mouse 150. POS 138 and manager workstation 140 may be operatively connected to a store communication router 152.

The presently-described embodiment includes a PCI router 154 configured to operatively connect secure communication portion 102 with store communication portion 104 so that devices within the secure communication portion may transmit data to devices within the store communication portion. PCI router 154 and other devices within secure communication portion 102, however, do not transmit sensitive data in the clear to devices within store communication portion 104. In this embodiment, PCI router 154 is connected to store communication router 152 via a communication path 156 and to secure device 108 via another communication path 158. Additionally, secure device 108 communicates with a host system 160 via a communication path 162, a portion of which may comprise a wide area network 164, such as the Internet.

It should be understood by those of ordinary skill in the relevant art that payment system 100 may comprise additional components. For instance, payment system 100 may include additional fuel dispensers, such as fuel dispenser 166, which is preferably identical in configuration and operation to fuel dispenser 106. In this case, fuel dispenser 166 is also operatively connected to secure device 108 via communication path 168, distributor box 110, and communication path 114.

In the presently-described embodiment, the devices and communication paths included within secure communication portion 102 are configured to comply with the PA-DSS. For instance, any sensitive cardholder data transmitted via communication paths 112, 114, and 158 is encrypted, including any data transmitted to host system 160 via communication path 168. This portion is referred to as "secure" or as a "secure environment," as should be understood by those of ordinary skill in the art. As set forth above, sensitive cardholder data is not transmitted in the clear to store communication portion 104.

Figure 2:
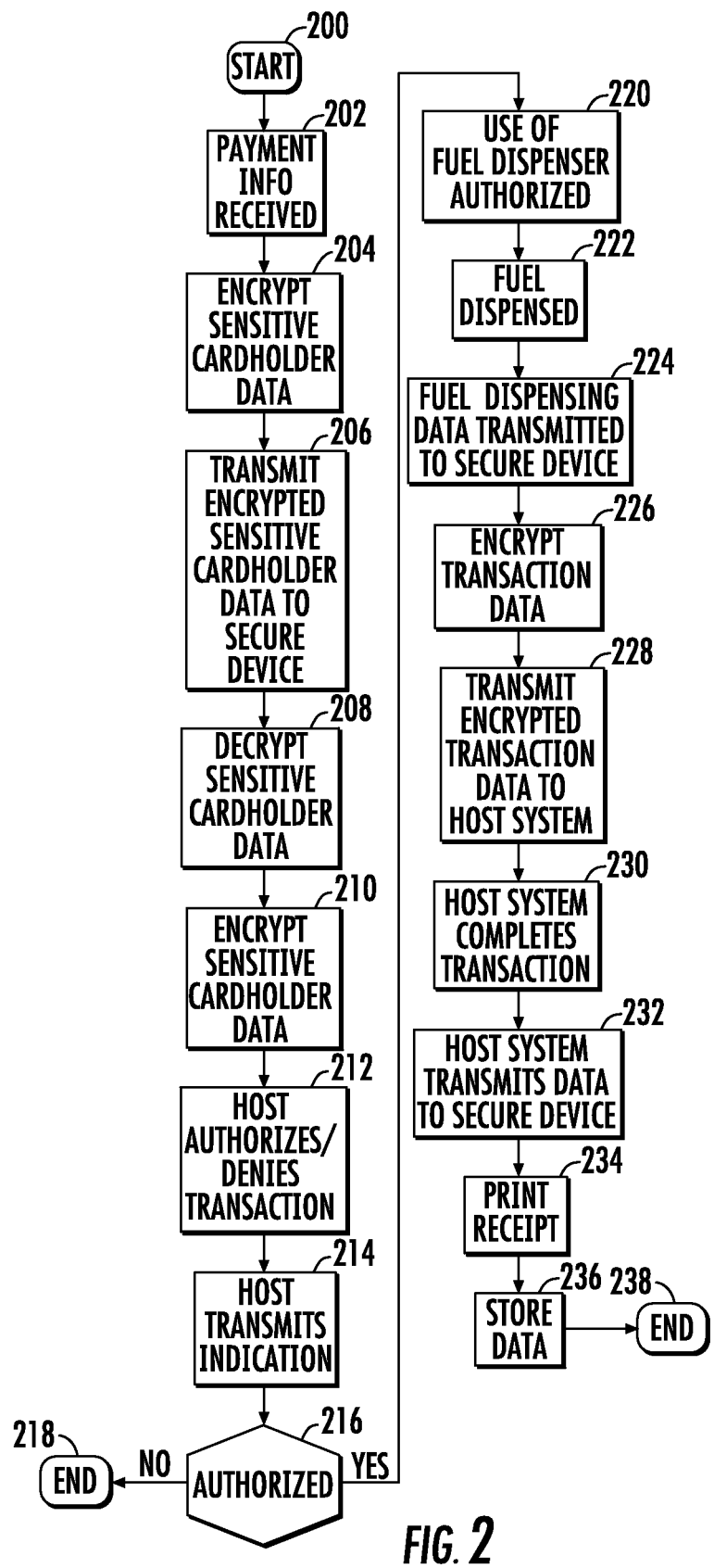
FIG. 2 is a flowchart illustrating an exemplary method for processing a payment transaction using the system of FIG. 1.

FIG. 2 illustrates exemplary methodology for processing a payment transaction in the environment of a fueling site. Referring to FIGS. 1 and 2, a customer positions a vehicle adjacent to fuel dispenser 106 at step 200. In the presently-described embodiment, the customer provides account information to fuel dispenser 106 using card reader 122 and PIN pad 124 at step 202 as is well-known. The account information comprises sensitive cardholder data typically including the customer's PAN and corresponding PIN, but may also include other information, such as the CVV2 or the billing zip code associated with the customer's account. At step 204, processing device 118 encrypts the sensitive cardholder data using encryption algorithm and keys stored in memory 119. At step 206, processing device 118 transmits the encrypted, sensitive cardholder data via communication path 112, distribution box 110, and communication path 114 to secure device 108.

In the presently-described embodiment, the encryption scheme, algorithm, keys, and/or ciphers used by secure device 108 and fuel dispenser 106 to communicate securely are different from those used by the secure device to communicate securely with host system 160. Accordingly, using the encryption algorithm and keys stored in memory 138, processing device 136 decrypts the sensitive cardholder data received from fuel dispenser 106. Using the encryption algorithm and keys stored in memory 138 corresponding to the encryption scheme used by the corresponding host system 160, processing device 136 encrypts the sensitive cardholder data at step 210. Secure device 108 then transmits the encrypted, sensitive cardholder data to host system 160 via communication path 162 at step 210. Host system 160 uses the received sensitive cardholder data to authorize or deny the transaction at step 212.

At step 214, host system 160 returns an indication to secure device 108 as to whether the transaction was authorized or denied. Secure device 108 determines if the transaction was authorized at step 216. If not, the process terminates at step 218, which may include informing the customer that the transaction was denied, as should be understood by those of ordinary skill in the art. If the transaction was authorized, process flow proceeds to step 220 where processing device 118 authorizes use of fuel dispenser 106.

At step 222, the customer uses fuel dispenser 106 to dispense fuel to the customer's vehicle. In operation, fuel flows from the underground storage tank(s) via piping network 126, through meter 128, to hose 132, and is delivered to the customer's vehicle via nozzle 134. Meter 128 is responsive to the flow rate or volume of fuel passing through it. Pulser 130 is operatively connected to meter 128, generates a signal that is indicative of the flow rate or volume, and transmits the signal to processing device 118. Fuel dispenser 106 may include additional components that assist in delivery of the fuel to a customer's vehicle as should be understood by those of ordinary skill in the art.

Upon completion of the refueling process, processing device 118 transmits data at step 224 to secure device 108 representative of the refueling transaction, such as the total volume of fuel dispensed. The transmission from fuel dispenser 106 additionally indicates that the transaction should be finalized. At step 226, secure device 108 encrypts the transaction data, which includes the total transaction amount and sensitive cardholder data. At step 228, secure device 108 transmits the encrypted transaction data to host system 160. At step 230, host system 160 performs various functions that should be well-known to those of ordinary skill in the relevant art, such as debiting the customer's account based on the information received. At step 232, host system 160 may transmit to secure device 108 certain information, such as a confirmation number. At step 234, secure device 108 may transmit data representative of this information to POS 138 or to fuel dispenser 106 in order to provide the customer with a receipt if desired. This data does not include any sensitive cardholder data.

At step 236, data representative of the financial transaction is stored by secure device 108 in memory 138. Preferably, the data is encrypted using the encryption scheme stored in memory 138 specific to secure portion 102 before being stored in memory. It should be understood, however, that secure device 108 may encrypt the data using an encryption scheme stored in memory 138 different from those associated with secure portion 102 or with host system 160. The stored data may include the confirmation number and typically includes the total amount of the transaction and at least a portion of the sensitive cardholder data, such as the PAN associated with the customer's account. The operator of payment system 100 may require this information for various reasons, such as for accounting or reporting, as set forth above. As should be understood by those of ordinary skill in the art, secure device 108 is configured to allow the operator to predefine the amount of time data representative of each financial transaction is stored in memory 138. For instance, secure device 108 may be configured to store the data for each transaction in memory for 60 days following completion of the transaction, after which it is securely erased as explained below. After the data is stored in memory 138, the process terminates at step 238.

Figure 3:
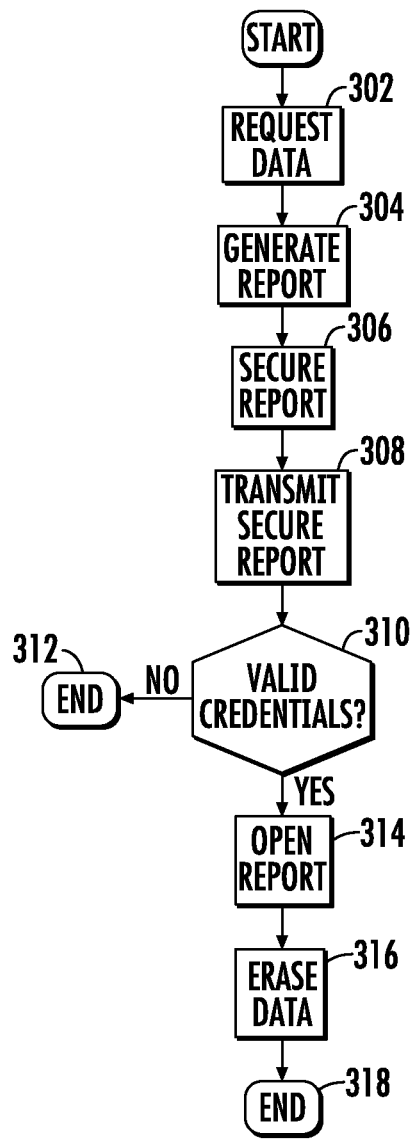
FIG. 3 is a flowchart illustrating an exemplary method for creating a secure report using the system of FIG. 1.

FIG. 3 illustrates exemplary methodology for creating a secure report in the environment of a fueling site. Referring additionally to FIG. 3, when information stored in memory 138 is needed, a user authorized to access the information sends a request at step 302 to secure device 108 for the information. The information may be requested from POS 138 or from another device, such as manager workstation 140. By way of an example, the manager or operator of the fueling site may request a report identifying all the transactions executed by payment system 100 during a specific timeframe, such as the previous day, week, or month. The report typically includes at least the total transaction amount and associated PAN for each financial transaction occurring during the relevant timeframe.

Figure 4:
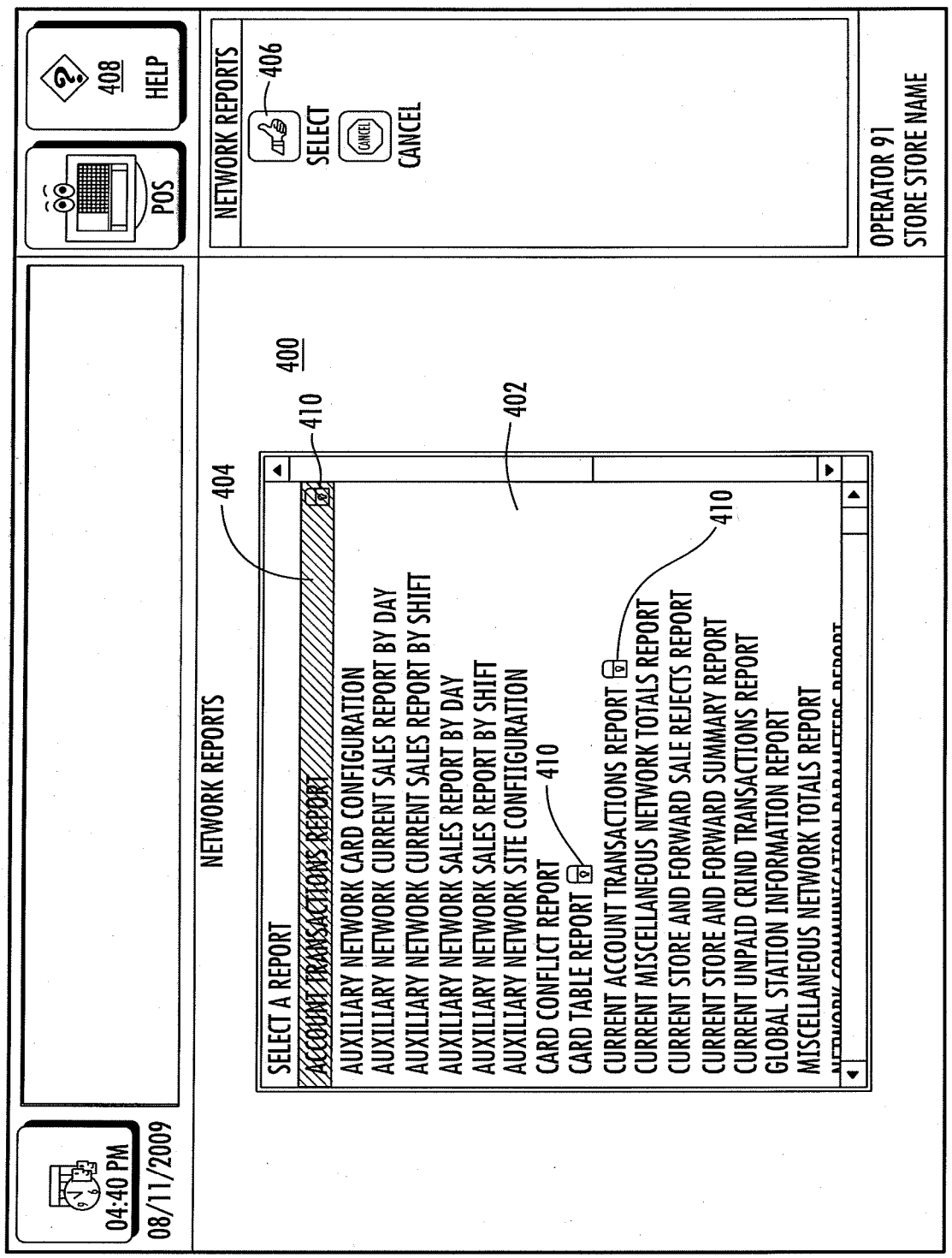
FIG. 4 illustrates an exemplary graphical user interface configured to allow a user to request various reports using the system of FIG. 1.

FIG. 4 illustrates an exemplary graphical user interface ("GUI") 400 configured to allow a user to request various reports. GUI 400 comprises a report selection list 402, selection indicia 404, and a select button 406. Those of ordinary skill in the art should understand that the GUIs described herein may include other components and functionality, such as a help button 408. Report selection list 402 presents a list of available reports, while selection indicia 404 indicates which report has been selected. In order to view a report, the user activates select button 406 after selecting the desired report. Preferably, indicia indicating that a report is secure appears adjacent to each secure report, commonly denoted at 410. As should be understood, the user may perform various other functions using GUI 400, such as activating help button 408, which presents the user with instructions on how to use GUI 400. In this example, the Account Transaction Report has been selected (indicated by selection indicia 404). In order to view the report, the user activates select button 406.

Referring again to FIG. 3, upon receipt of a request for a secure report, secure device 108 generates the secure report containing the requested information corresponding to the transaction from the data stored in memory 138 at step 304, as explained in more detail below. Data transmitted within store communication portion 104 is not encrypted as set forth above. Accordingly, at step 306, processing device 136 uses a password and an encryption scheme stored in memory 138 to encrypt and password-protect the report, thereby securing it. In a preferred embodiment, the 128-bit Advanced Encryption Standard ("AES" or "AES-128") is used to encrypt the report, although it should be understand that other suitable encryption standards and schemes may be used. It should be further understood from the above description that a secure report may be one that is encrypted or password-protected, but is preferably both encrypted and password-protected in the presently-described embodiment.

The password used to protect the report is preferably a strong password, including numbers, symbols, and upper and lowercase letters. The password should be at least twelve characters in length, and avoid being based on repetition, dictionary words, sequences, or names. In the presently-describe embodiment, the password is supplied to secure device 108 during the device's installation, which stores the password in memory 136. In a preferred embodiment, secure device 108 is configured to accept a strong password only. The password may then be made known to only those users of payment system 100 who are authorized to view the secure reports.

Memory 138 also includes a module that when executed by processing device 136 provides a secure socket layer ("SSL") communication portal between secure device 108 and another device, such as manager workstation 140. The SSL communication portal allows another device to communicate securely with secure device 108. In this regard, processing device 136 is configured to change the password stored in memory 138 pursuant to instructions provided by a user of the other device over the SSL communication path. For instance, the operator of the fueling site using manager workstation 140 may change the password via the SSL communication portal. Those of ordinary skill in the art should understand that the user must supply the requisite credentials to access secure device 108 via the SSL communication path, such as a valid username and password, in order to change the password used to secure the reports. It should be further understood that the password to access secure device 108 via the SSL communication portal may be different than the password used to protect the secure reports.

At step 308, secure device 120 then transmits the encrypted, password-protected report to the device that requested it, such as manager workstation 140, by the file transfer protocol ("ftp"). In order to open the secure report, the user must supply the correct encryption cipher or key and the correct password at step 310. If this is not done, the user is unable to open the report and the process terminates at step 312. Otherwise, the user may open the report and utilize the information contained therein for the intended purpose at step 314. As noted above, the password is only provided to users authorized to access the reports in order to comply with the PA-DSS.

Figure 5:
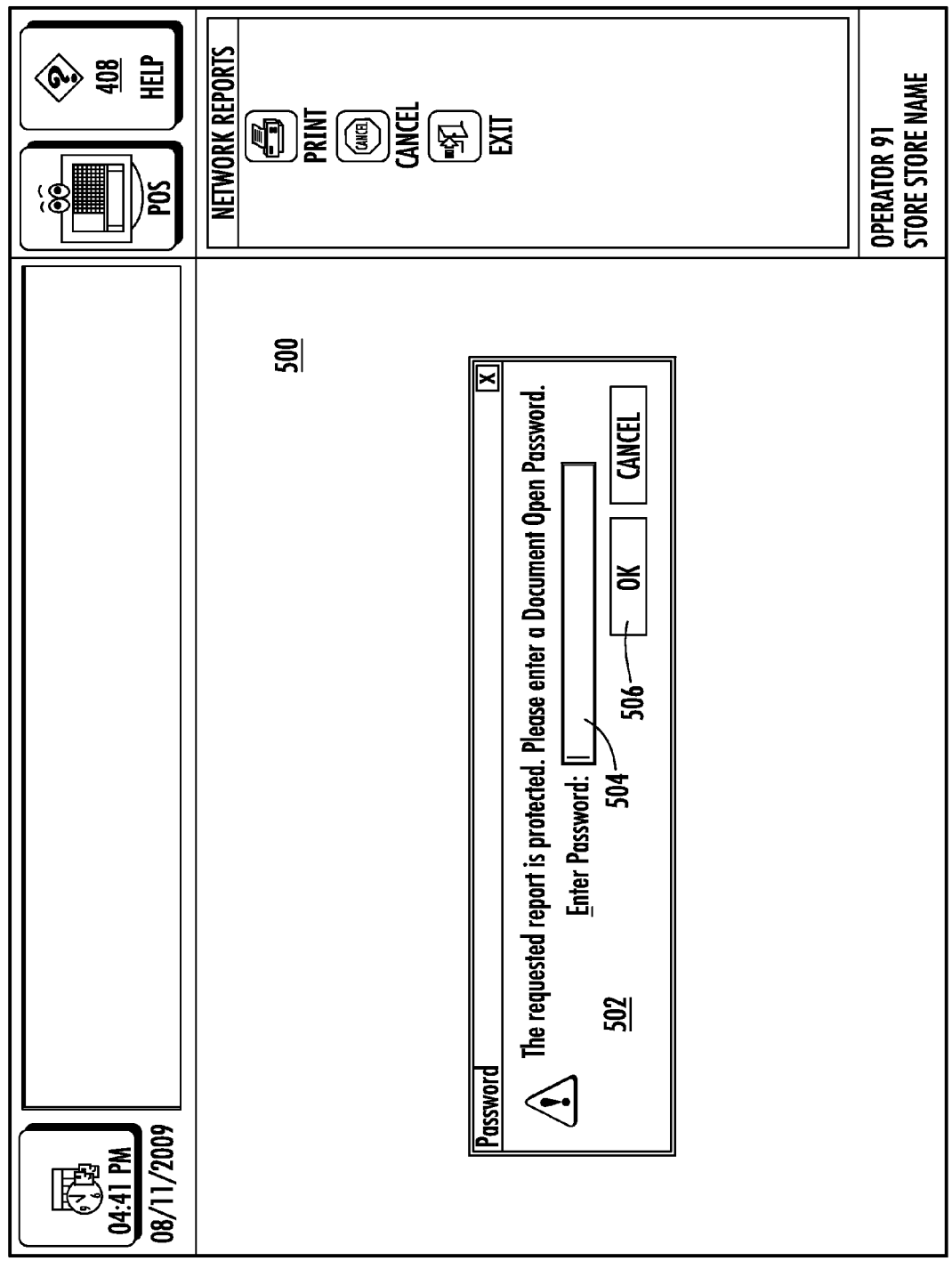
FIG. 5 illustrates an exemplary graphical user interface configured to allow a user to enter a password to view a secure report using the system of FIG. 1.

FIG. 5 illustrates an exemplary GUI 500 configured to allow a user to enter a password to view a secure report. GUI 500 comprises a password request notification 502, a password entry box 504, and an entry button 506. If the user selects a report that is secure, as described above, GUI 500 presents password request notification 502 to the user. The user supplies the password by entering it into password entry box 504, after which the users activates entry button 506.

Figure 6:
FIG. 6 illustrates an exemplary graphical user interface configured to display reports using the system of FIG. 1.

FIG. 6 illustrates an exemplary GUI 600 configured to display reports to the user. GUI 600 comprises a report area 602, a menu bar 604, a print button 606, and a cancel button 608. If the user requests a secure report and the password supplied by the user via password entry box 504 (FIG. 5) is correct, GUI 600 displays the secure report in report area 602. Menu bar 604 provides tools to help view the report, such as the ability to zoom in and out on portions of the report. Activation of print button 606 prints the displayed report to a printer operatively connected to the device on which GUI 600 is presented, while activation of cancel button 608 closes the report.

In a preferred embodiment, the encrypted, password-protected report is generated in the Portable Document Format ("PDF"). Because the PDF is independent of application software, hardware, and operating systems, the encrypted, password-protected report may be opened and viewed on any suitable system. In one embodiment, PDF creation software provided by Winnovative Software Solutions (or Outside Software Inc.) of Bucharest, Romania is used by secure device 108 at steps 304 and 306 to generate and secure the PDF report. It should be understood by those of ordinary skill in the relevant art, however, that other suitable methods for generating encrypted, password-protected reports in the PDF may be utilized. It should be further understood that encrypted, password-protected reports may also be generated in other suitable formats or by other suitable applications capable of encrypting and password-protecting a document. For instance, one or more of the programs contained in the OFFICE SUITE offered by Microsoft, Corporation of Redmond, Wash. allow encryption and password-protection. Those of ordinary skill in the art should appreciate, however, that such reports may not be accessible on every system or platform. It should be further understood that in an embodiment where one program both generates and secures the report, steps 304 and 306 are combined into one step.

Referring again to FIG. 3, at step 316, secure device 108 securely deletes data corresponding to each transaction stored in memory 138 including any sensitive cardholder data after a predefined amount of time has lapsed following completion of the transaction. Those of ordinary skill in the art should understand that the manner in which the sensitive cardholder data is securely erased is performed pursuant to the PA-DSS. The required process may include deleting the data from the relevant portions of memory 138 and writing data over those portions a predefined number of times. The process then terminates at step 318.

An authorized user may transmit the encrypted, password-protected report by electronic mail ("email") or by other suitable means to another authorized user or to another location. It should be understood by those of ordinary skill in the art that the report remains secure due to its encryption and password-protection even when transmitted. Only users who possess the correct password and encryption scheme, keys, and/or ciphers are able to open the report and access the information contained therein. Accordingly, the password and the report are not stored or transmitted together.

In another embodiment where the report is generated in the PDF, certain options standard to the PDF are enabled within the encrypted, password-protected report at step 306. For instance, secure device 108 may ensure that the "No Copy Content" option is enabled when generating the report, thereby preventing any user from copying any portion of the report's contents to another location, such as into an unsecure document or report. Other options preferably selected in this embodiment when the report is generated in the PDF include "No Assemble Document," "No Copy Document," "No Edit Annotations," "No Edit Content," and "No Fill Form Fields."

In another embodiment, when a secure report is transmitted, such as at step 308, it is accompanied by indicia that indicate the document is secured; i.e., that the report is encrypted and password-protected. The receiver recognizes that the report is secure due to the inclusion of the indicia with the report. As a result, architects of systems configured to accept the secure reports understand that a password will be required in order to access each report. Systems that attempt to open the secure reports without first requesting a password will generate an error. Engineers and programmers may therefore create systems capable of using the secure reports by including modules or software that instruct the user to supply the required password due to the inclusion of the indicia. Requesting the password before the system attempts to open or use the report due to the included indicia prevents the error.

One of ordinary skill in the art should understand that the above description discloses a system and method for generating and transmitting secure reports or documents in a retail environment in compliance with the PA-DSS. While the system and method were described above with respect to a fueling environment, it should be appreciated that the provided example does not limit the scope of the present invention. Thus, it may be utilized in any retail or payment system comprising both secure and unsecure portions, where users of the unsecure portions may require access to sensitive cardholder data or other information for various purposes, such as reporting, accounting, or reconciliation. This approach allows cardholder data, such as the PAN, to be transmitted out of the PA-DSS or secure environment in an approved manner. As a result, this allows the POS or other unsecured device to remain out of scope for PA-DSS compliance, without incurring the cost of additional hardware to the fueling site.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for transmitting information securely in a retail fueling environment comprising at least one secure device and a plurality of retail devices including at least one fuel dispenser, wherein the at least one secure device is operatively connected to a host system, the method comprising:
   encrypting sensitive data comprising payment card information at a retail device, wherein the retail device and the at least one secure device are both located within a secure communication portion at the retail environment;
   storing the sensitive data by the at least one secure device;
   decrypting, at the at least one secure device, the encrypted sensitive data;
   encrypting the decrypted sensitive data by the at least one secure device;
   transmitting the sensitive data that has been encrypted by the at least one secure device from the at least one secure device to the host system, wherein the host system is remote from the retail environment and located outside of the secure communication portion;
   receiving a request from outside the secure communication portion of the retail fueling environment for at least a portion of the sensitive data stored at the at least one secure device;
   generating a secure report in the form of an electronic file by the at least one secure device, said secure report containing genuine sensitive data; and
   transmitting the secure report via a communication path to another device outside the secure communication portion by the at least one secure device.

2. The method of claim 1 wherein one of the another device and communication path is unsecure.

3. The method of claim 1 wherein the step of generating a secure report by the at least one secure device comprises encrypting the secure report.

4. The method of claim 1 wherein the step of generating a secure report by the at least one secure device comprises password-protecting the secure report.

5. The method of claim 3 wherein the step of generating a secure report by the at least one secure device further comprises password-protecting the secure report.

6. The method of claim 1 further comprising receiving the sensitive data from a customer at the retail device.

7. The method of claim 1, further comprising:
   receiving, at the at least one secure device, data representative of a financial transaction from the host system based at least in part on the sensitive data;
   encrypting the data representative of the financial transaction; and
   storing the data representative of the financial transaction at the at least one secure device.

8. The method of claim 7, wherein the secure report includes the data representative of the financial transaction.

9. The method of claim 1, wherein the at least a portion of the sensitive data in the secure report comprises sensitive data related to multiple retail devices.

10. The method of claim 1, wherein the at least a portion of the sensitive data in the secure report comprises sensitive data related to multiple customer accounts.

11. A fueling environment comprising:
    at least one fuel dispenser;
    at least one secure device operatively connected to the at least one fuel dispenser, wherein the at least one secure device is configured to:

receive sensitive data comprising payment card information from the at least one fuel dispenser, wherein the sensitive data has been encrypted at the at least one fuel dispenser;

decrypt the sensitive data encrypted at the at least one fuel dispenser;

encrypt the sensitive data;

transmit, to a host system, the sensitive data that has been encrypted by the at least one secure device, wherein the host system is remote from the at least one fuel dispenser and the at least one secure device;

store at least a portion of the sensitive data;

receive a request for at least a portion of the sensitive data stored at the at least one secure device;

generate a secure report in the form of an electronic file, said secure report containing genuine sensitive data; and transmit the secure report via a communication path to another device by the at least one secure device.

12. The fueling environment of claim 11 wherein the secure device is configured to store the sensitive data within the at least one secure device in encrypted form.

13. The fueling environment of claim 11 further comprising at least one unsecure device, wherein the at least one secure device is configured to transmit the secure report to the at least one unsecure device.

14. The fueling environment of claim 11 wherein the at least one secure device is configured to encrypt and password-protect the secure report.

15. The fueling environment of 13 wherein the at least one secure device is configured to generate the secure report based on a request received from the at least one unsecure device.

16. The fueling environment of claim 11, wherein the at least one secure device is further configured to:

receive, at the at least one secure device, data representative of a financial transaction from the host system based at least in part on the sensitive data;

encrypt the data representative of the financial transaction; and store the data representative of the financial transaction at the at least one secure device.

17. The fueling environment of claim 16, wherein the secure report includes the data representative of the financial transaction.

18. The fueling environment of claim 11, wherein the at least a portion of the sensitive data in the secure report comprises sensitive data related to multiple retail devices.

19. The fueling environment of claim 11, wherein the at least a portion of the sensitive data in the secure report comprises sensitive data related to multiple customer accounts.

20. A secure device for generating a secure report associated with a financial transaction comprising:

a processing device; and memory operatively connected to the processing device, wherein the memory comprises computer-readable instructions that, when executed by the processing device, perform a method comprising the steps of:

receiving sensitive data comprising payment card information from a retail device that encrypted the sensitive data;

decrypting the sensitive data that was encrypted at the retail device;

encrypting sensitive data associated with the financial transaction received by the secure device;

storing at least a portion of the sensitive data;

transmitting, to a host system, the sensitive data that has been encrypted by the secure device, wherein the host system is remote from the retail device and the secure device;

receiving a request for at least a portion of the sensitive data stored at the at least one secure device;

generating a secure report in the form of an electronic file, said secure report containing genuine sensitive data; and transmitting the secure report via a communication path to another device by the at least one secure device.

21. The secure device of claim 20 wherein the step of generating a secure report comprises encrypting the secure report and password-protecting the secure report.

22. The secure device of claim 20 wherein the step of generating a secure report comprises generating the secure report in the portable document format.

23. The secure device of claim 20, the method further comprising the steps of:

receiving, at the secure device, data representative of a financial transaction from the host system based at least in part on the sensitive data;

encrypting the data representative of the financial transaction; and storing the data representative of the financial transaction at the at least one secure device.

24. The secure device of claim 23, wherein the secure report includes the data representative of the financial transaction.

25. The secure device of claim 20, wherein the at least a portion of the sensitive data in the secure report comprises sensitive data related to multiple retail devices.

26. The secure device of claim 20, wherein the at least a portion of the sensitive data in the secure report comprises sensitive data related to multiple customer accounts.

27. A method for transmitting information securely in a retail environment, the method comprising:

storing a predefined password;

receiving, by at least one secure device, sensitive data corresponding to a financial transaction and comprising payment card information from a retail device that encrypted the sensitive data;

decrypting, by at least one secure device, the sensitive data that was encrypted at the retail device;

encrypting the sensitive data by the at least one secure device;

storing, by the at least one secure device, sensitive data corresponding to the financial transaction;

transmitting, from the at least one secure device to a host system, the sensitive data that has been encrypted by the secure device, wherein the host system is remote from the retail device and the at least one secure device;

receiving a request from an unsecure device for at least a portion of the sensitive data;

generating a report containing genuine sensitive data;

password protecting the report using the predefined password;

encrypting the report; and transmitting the report to the unsecure device.

28. The method of claim 27 wherein the report is generated in a portable document format.

29. The method of claim 27 wherein the report is encrypted using an Advanced Encryption Standard.

30. The method of claim 27 wherein the report is transmitted using a file transfer protocol.

31. The method of claim 27 wherein the report is transmitted via a secure sockets layer.

32. The method of claim 27 wherein the report is transmitted with an indicia indicating the report is secure.

33. The method of claim 27 wherein the report is transmitted with an indicia indicating the report requires a password to access.

34. The method of claim 27, further comprising:
receiving, at the at least one secure device, data representative of a financial transaction from the host system based at least in part on the sensitive data;
encrypting the data representative of the financial transaction; and
storing the data representative of the financial transaction at the at least one secure device.

35. The method of claim 34, wherein the report includes the data representative of the financial transaction.

36. The method of claim 27, wherein the at least a portion of the sensitive data in the report comprises sensitive data related to multiple retail devices.

37. The method of claim 27, wherein the at least a portion of the sensitive data in the report comprises sensitive data related to multiple customer accounts.

* * * * *